United States Patent
Waterson et al.

(10) Patent No.: US 8,806,622 B2
(45) Date of Patent: Aug. 12, 2014

(54) FRAUDULENT PAGE DETECTION

(75) Inventors: David Lynch Waterson, London (GB); Bevan J Collins, Bay of Islands (NZ); Raghuram Vijapurapu, Auckland (NZ); Marcus Andrew Whittington, London (GB)

(73) Assignee: SentryBay Limited (GB)

(*) Notice: Subject to any disclaimer, the term of this patent is extended or adjusted under 35 U.S.C. 154(b) by 463 days.

(21) Appl. No.: 12/989,006

(22) PCT Filed: Apr. 21, 2009

(86) PCT No.: PCT/NZ2009/000058
§ 371 (c)(1),
(2), (4) Date: Jan. 18, 2011

(87) PCT Pub. No.: WO2009/131469
PCT Pub. Date: Oct. 29, 2009

(65) Prior Publication Data
US 2012/0023566 A1    Jan. 26, 2012

Related U.S. Application Data

(60) Provisional application No. 61/046,502, filed on Apr. 21, 2008.

(51) Int. Cl.
  G06F 7/04      (2006.01)
  G06F 17/30     (2006.01)
  H04L 29/06     (2006.01)
  H04L 12/58     (2006.01)
  G06Q 30/02     (2012.01)

(52) U.S. Cl.
  CPC ........ H04L 63/1483 (2013.01); H04L 63/1441 (2013.01); H04L 12/585 (2013.01); G06Q 30/0248 (2013.01)
  USPC ...................... 726/22; 726/3; 726/25; 726/26

(58) Field of Classification Search
  CPC ............ H04L 63/1483; H04L 63/1441; H04L 63/1425; H04L 12/585; H04L 63/1491; G06Q 30/02; G06Q 30/0601; G06Q 30/0248
  USPC .......................................... 726/3, 22–26, 30
  See application file for complete search history.

(56) References Cited

U.S. PATENT DOCUMENTS 7,457,823 B2    11/2008   Shraim et al.
7,523,016 B1 *   4/2009   Surdulescu et al. .......... 702/185

(Continued)

FOREIGN PATENT DOCUMENTS

CA    2588138 A1   6/2006
CA    2588723 A1   6/2006

(Continued)

OTHER PUBLICATIONS

Garera S., Provos N., Chew M., Rubin A. D. "A framework for detection and measurement of phishing attacks", Proceedings of the ACM Workshop on Recurring Malcode (WORM), 2007, 8 pages.*

(Continued)

*Primary Examiner* — Catherine Thiaw
(74) *Attorney, Agent, or Firm* — Arnold, Knobloch & Saunders, L.L.P.; Charles Knobloch

(57) ABSTRACT

A method of determining whether a page is a fraudulent page comprising the steps of: extracting a plurality of tokens from the page, (403) for each token, calculating a token probability being the probability of the token being in a fraudulent page (404), using the calculated token probabilities, calculating a page probability being the probability of the page being a fraudulent page (405), wherein the token probability of a token being in a fraudulent page is calculated based on a number of fraudulent pages and a number of non-fraudulent pages which contain the token from a training corpus of fraudulent pages and non-fraudulent pages.

10 Claims, 14 Drawing Sheets

(56) References Cited

U.S. PATENT DOCUMENTS

| | | | |
|---|---|---|---|
| 7,802,298 B1* | 9/2010 | Hong et al. | 726/22 |
| 7,925,044 B2* | 4/2011 | Metois et al. | 382/100 |
| 8,205,255 B2* | 6/2012 | Benea et al. | 713/194 |
| 2003/0065926 A1* | 4/2003 | Schultz et al. | 713/188 |
| 2005/0257261 A1 | 11/2005 | Shraim et al. | |
| 2006/0068755 A1 | 3/2006 | Shraim et al. | |
| 2006/0069697 A1 | 3/2006 | Shraim et al. | |
| 2006/0090073 A1* | 4/2006 | Steinberg et al. | 713/170 |
| 2006/0095524 A1* | 5/2006 | Kay et al. | 709/206 |
| 2006/0123478 A1* | 6/2006 | Rehfuss et al. | 726/22 |
| 2006/0212930 A1* | 9/2006 | Shull et al. | 726/10 |
| 2006/0253580 A1* | 11/2006 | Dixon et al. | 709/225 |
| 2007/0039038 A1* | 2/2007 | Goodman et al. | 726/2 |
| 2007/0094500 A1 | 4/2007 | Shannon et al. | |
| 2007/0107053 A1* | 5/2007 | Shraim et al. | 726/22 |
| 2007/0107054 A1 | 5/2007 | Averbuch et al. | |
| 2007/0192853 A1 | 8/2007 | Shraim et al. | |
| 2007/0192855 A1 | 8/2007 | Hulten et al. | |
| 2007/0239999 A1* | 10/2007 | Honig et al. | 713/194 |
| 2007/0294352 A1 | 12/2007 | Shraim et al. | |
| 2007/0294762 A1 | 12/2007 | Shraim et al. | |
| 2007/0299777 A1 | 12/2007 | Shraim et al. | |
| 2007/0299915 A1 | 12/2007 | Shraim et al. | |
| 2008/0046738 A1* | 2/2008 | Galloway et al. | 713/176 |
| 2008/0092242 A1* | 4/2008 | Rowley | 726/27 |
| 2008/0131006 A1* | 6/2008 | Oliver | 382/229 |
| 2008/0133540 A1* | 6/2008 | Hubbard et al. | 707/10 |
| 2008/0141376 A1* | 6/2008 | Clausen et al. | 726/24 |
| 2008/0184371 A1* | 7/2008 | Moskovitch et al. | 726/24 |
| 2009/0064330 A1 | 3/2009 | Shraim et al. | |
| 2009/0094669 A1* | 4/2009 | Savadi et al. | 726/1 |
| 2009/0157675 A1* | 6/2009 | Stellhorn et al. | 707/6 |
| 2009/0222243 A1* | 9/2009 | Zoldi et al. | 703/2 |
| 2010/0049975 A1* | 2/2010 | Parno et al. | 713/168 |

FOREIGN PATENT DOCUMENTS

| | | | |
|---|---|---|---|
| EP | 1794683 | A2 | 6/2007 |
| EP | 1815667 | A2 | 8/2007 |
| EP | 1825398 | A2 | 8/2007 |
| JP | 2007139864 | A | 6/2007 |
| KR | 20070067651 | A | 6/2007 |
| WO | 2005109225 | A2 | 11/2005 |
| WO | 2006042480 | A2 | 4/2006 |
| WO | 2006058217 | A2 | 6/2006 |
| WO | 2006060284 | A2 | 6/2006 |

OTHER PUBLICATIONS

Saberi A., Vahidi M., Behrouz M. B. "Learn to detect phishing scams using Learning and Ensemble Methods", IEEE/WIC/ACM International Conferences on Web Intelligence and Intelligent Agent Technology-Workshops, 2007, pp. 311-314.*

Saberi A., Vahidi M., Behrouz M. B. "Learn to detect phishing scams using Learning and Ensemble Methods", IEEE/WIG/ACM International Conferences on Web Intelligence and Intelligent Agent Technology-Workshops, 2007, pp. 311-314.

International Search Report based on International Application No. PCT/NZ2009/000058, Form PCT/ISA/210, 6 pages, mailed Jul. 30, 2009.

* cited by examiner

Figure 13

FRAUDULENT PAGE DETECTION

FIELD OF THE INVENTION

The present invention relates to method, software and/or system for detecting fraudulent pages obtained from a server over a network, and in particular, although not solely, for detecting fraudulent (phishing) web pages retrieved from the internet.

BACKGROUND TO THE INVENTION

The internet is now an important tool for retrieving information and for commercial activity. Users on a remote terminal can retrieve web pages over the internet from a remote server. Such web pages contain useful information and can also be used for commercial activity. For example, people can use the pages to submit information along with requests for purchasing products and services.

The process of providing sensitive personal and commercial details over the internet has provided an avenue for criminal activity. Imposter web pages that mimic genuine web pages are frequently used to fraudulently obtain sensitive information from end users. Such pages are generally termed "phishing" web pages, and the sites they form part of are called "phishing" web sites.

Typically a phishing page will closely resemble a genuine web page and entice users to provide information. For example, where a person conducts internet banking they can enter their passwords, along with monetary transactions through the genuine website provided by their bank. A phishing page could resemble such a genuine page in a manner that might not be easily detected by the end user. When the fraudulent page is passed to the user, they enter their sensitive information in the usual manner which, once submitted, can then be used by the entity providing the phishing page for illegal purposes.

Phishing pages are becoming an ever increasing problem on the internet. They put end users at risk of losing information and money, and also put genuine commercial entities at risk of losing credibility with their customers.

SUMMARY OF THE INVENTION

It is an object of the present invention to provide a method, software tool and/or system to assist in detecting fraudulent pages.

In one aspect the present invention may be said to consist in a method of determining whether a page is a fraudulent page comprising the steps of: extracting a plurality of tokens from the page, for each token, calculating a token probability being the probability of the token being in a fraudulent page, using the calculated token probabilities, calculating a page probability being the probability of the page being a fraudulent page, wherein the token probability of a token being in a fraudulent page is calculated based on a number of fraudulent pages and a number of non-fraudulent pages which contain the token from a training corpus of fraudulent pages and non-fraudulent pages.

Preferably the method further comprises the step of determining that the page is a fraudulent page if the page probability is greater than a threshold.

Preferably the method further comprises downloading a token database comprising, for each of a plurality of tokens, information indicating the number of fraudulent pages and non-fraudulent pages that contain the token from the training corpus of fraudulent and non-fraudulent pages.

Preferably the token database further comprises a count of the number of fraudulent pages in the training corpus, and a count of the number of non-fraudulent pages in the training corpus.

Preferably the token database is generated according to a method described herein.

Preferably calculating a token probability utilises Bayesian statistics.

Preferably calculating a token probability comprises: determining if the token exists in the token database, and calculating a token probability using:

$$\frac{trainingCorpus.b}{trainingCorpus.b + trainingCorpus.g \frac{trainingSet.nbad}{trainingSet.ngood}}$$

where:
  trainingCorpus.b is the number of fraudulent pages in the training corpus that contain the token,
  trainingCorpus.g is the number of non-fraudulent pages in the training corpus that contain the token,
  trainingSet.nbad is the number of fraudulent pages used in the training corpus,
  trainingSet.ngood is the number of non-fraudulent pages used in the training corpus.

Preferably if a token does not exist in the token database then the token probability is set at a predetermined value.

Preferably calculating the page probability of the page being a fraudulent page comprises multiplying together the token probabilities of the tokens or some derivation of the token probabilities.

Preferably calculating the page probability of the page being a fraudulent page comprises: calculating a first probability comprising multiplying together the token probabilities of the tokens, calculating a second probability comprising multiplying together (1—the token probability) for each token probability of the tokens, calculating a further probability being the first probability divided by the sum of the first and second probabilities.

Preferably extracting a plurality of tokens from the page comprises one or more of extracting text of the page or frame of the page and/or the title of the page, and extracting tokens from the text, or performing optical character recognition of an image of the page or frame and/or the title of the page and extracting tokens from the optically recognised characters.

Preferably calculating the page probability of the page being a fraudulent page comprises: calculating a first page probability using the calculated token probabilities for tokens extracted from text, and calculating a second page probability using the calculated token probabilities for tokens extracted from optically recognised characters.

Preferably determining that the page is a fraudulent page if any page probability is greater than a threshold.

In another aspect the present invention may be said to consist in a method of determining whether a page is a fraudulent page comprising: extracting a plurality of tokens from the page, for each token, calculating a token probability being the probability of the token being in a fraudulent page, using the calculated token probabilities, calculating a page probability being the probability of the page being a fraudulent page using Bayesian statistics.

Preferably determining whether a website page is a fraudulent page comprising: obtaining text from the page, extracting a first set of tokens from the text, and for each token from the first set calculating a token probability, being the probability of the token being in a fraudulent page, determining a first page probability, being a probability that the page is a fraudulent page, from the token probabilities for the first set of tokens, performing optical character recognition on an image of the page, extracting a second set of tokens from the image of the page, and for each token from the second set calculating a token probability, being the probability of the token being in a fraudulent page,
determining a second page probability, being probability that the page is a fraudulent page, from the token probabilities for the second set of tokens.

Preferably determining that the page is a fraudulent page is based on the first and second page probabilities.

Preferably the method further comprises the steps of determining one or more of: if the page does not have a password field, if the page has a known URL, and if so, determining that the page is not a fraudulent page.

Preferably generating a token database for use in determining whether a page is a fraudulent page comprising: extracting tokens from one or more preselected pages, each preselected page being known as a fraudulent page or a non-fraudulent page, and for each token, accumulating a count of the number of fraudulent pages the token occurs in accumulating a count of the number of non-fraudulent pages the token occurs in.

Preferably the preselected pages from which tokens are extracted comprise a training corpus, the method further comprising accumulating a count of the number of preselected fraudulent pages in the training corpus, and accumulating a count of the number of preselected non-fraudulent pages in the training corpus.

In another aspect the present invention may be said to consist in a method of determining whether a page is a fraudulent page comprising the steps of: providing a database comprising for each of a number of tokens occurring in a number of training pages a count of the number of fraudulent pages the token occurs in and a count of the number of non-fraudulent pages the token occurs in, wherein the database is used to analyse a page to determine if it is fraudulent by using the database to determine token probabilities of tokens extracted from the page.

In another aspect the present invention may be said to consist in a system for analysing pages for fraudulence comprising an end user PC, server or service adapted to download a page and adapted to:
extract a plurality of tokens from the page, for each token, calculate a token probability being the probability of the token being in a fraudulent page, using the calculated token probabilities, calculate a page probability being the probability of the page being a fraudulent page, wherein the token probability of a token being in a fraudulent page is calculated based on a number of fraudulent pages and a number of non-fraudulent pages which contain the token from a training corpus of fraudulent pages and non-fraudulent pages.

In another aspect the present invention may be said to consist in a system for determining fraudulence of a page comprising a server adapted to: provide a database comprising for each of a number of tokens occurring in a number of training pages a count of the number of fraudulent pages the token occurs in and a count of the number of non-fraudulent pages the token occurs in, wherein the database is used to analyse a page to determine if it is fraudulent by using the database to determine token probabilities of tokens extracted from the page.

In another aspect the present invention may be said to consist in a system for generating a database for use in determining fraudulence of a page comprising a system adapted to:
extract tokens from one or more preselected pages, each preselected page being known as a fraudulent page or a non-fraudulent page, and for each token, accumulate a count of the number of fraudulent pages the token occurs in, accumulate a count of the number of non-fraudulent pages the token occurs in.

In another aspect the present the invention may be said to consist in a system for determining whether a web page is fraudulent by analysing web traffic passing through a gateway, at an organizational perimeter, through managed services provided to multiple organizations beyond the organizational perimeter, or at the ISP, in such a manner that the web traffic is analysed for the existence of fraudulent phishing sites targeting multiple entities.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Preferred embodiments of the invention will be described with reference to the following drawings, of which:

FIG. 13 is a screen shot of a fraudulent page.

DETAILED DESCRIPTION OF PREFERRED EMBODIMENTS

The present invention relates generally to a method, software tool and/or system for detecting fraudulent pages and optionally a method, software tool and/or system for protecting end users from receiving fraudulent pages that may trick them into unwillingly providing sensitive information.

The term "page" can generally refer to any page, such as a web site page, that can be displayed to a user on a client PC via a browser or other display tool. The term "client PC" refers to any device with computing capabilities, including but not limited to a mobile phone, Personal Digital Assistant or PDA, terminal services, thin client, etc. In the preferred embodiment the invention relates to web site pages. The information defining the page is retrieved over the internet (or other network) from a server. The information typically will take the form of HTML or other mark up language, along with other code for rendering graphics and tools for provision to a user. The web site page (which can be termed a "web page") will typically form one of many such pages comprising a web site.

In most cases, pages that are provided over the internet are provided for legitimate purposes by genuine entities. However, web pages can be fraudulent pages. Where the web page is fraudulent, that is where it is emulating or mimicking a genuine web page for nefarious purposes, then the page can be colloquially termed a "phishing" page. It will be appreciated that while the embodiments of the present invention will be described in relation to web pages served over the internet, the invention could be more generally used for any pages served over any type of network.

The computer user can also be presented with fraudulent pages through "pharming", whereby traffic is redirected through changing the host file on the victim's computer, or through an attack directed at the DNS (Domain Name Server) software. In this specification, all attempts to display a fraudulent web page, including "phishing", "pharming", "cross-site scripting", or any other method, are referred to by the general term "phishing".

Overview of Overall System/Method

Figure 1A:
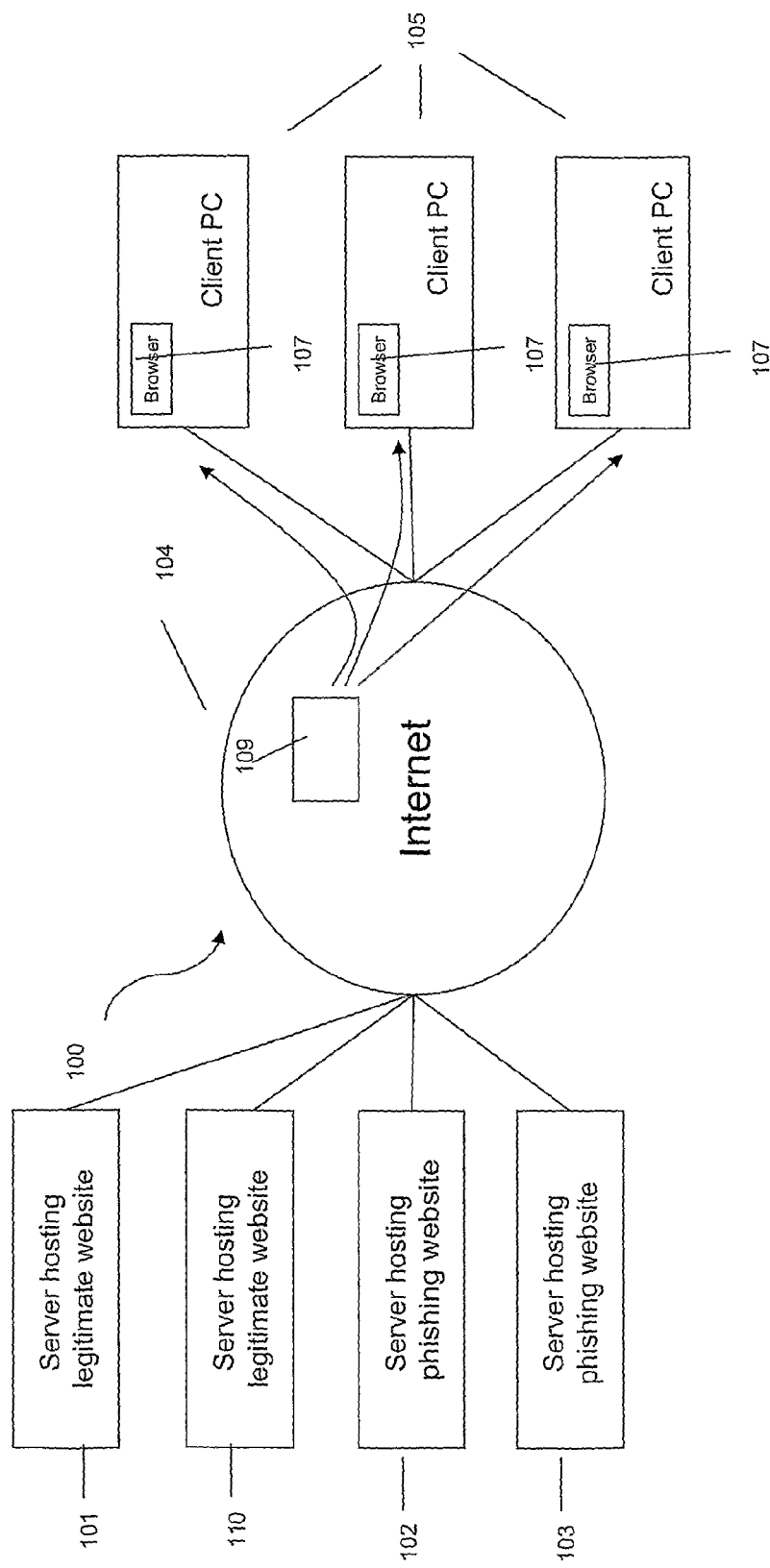
FIG. 1a is a block diagram of a system that implements fraudulent page detection.

FIG. 1a is a block diagram showing a general overview of a system that can implement fraudulent page detection to protect end users from fraudulent pages. A number of independent end users can each have their own client computer (end user PC) 105 connected to the internet 104. Each client computer 105 comprises a browser 107 for accessing the internet. The browser can retrieve a web page e.g. 109 from a server over the internet and display the web page to a user on their browser 107, along with any tools and graphics embedded in the web page. In many cases, the web page may have fields for entering information, which can be populated by the user. Upon submission, the information is sent back over the internet to the server for use by the requesting entity.

A large number of servers e.g. 101, 102, 103, 110 are connected to the internet for providing web pages to end users upon request. When an end user wants a particular page, they will enter in a URL into their browser, which can be resolved to determine the location of the corresponding pages. Upon receiving a request the server will provide the pages 109 over the internet to the client PC 105 for display via the browser 107. The vast majority of servers provide legitimate and genuine web pages. These are generally shown by the boxes 101, 110 in FIG. 1. However, a small percentage of servers may host fraudulent web pages e.g. 102, 103 that can be provided to end users to fraudulently obtain information. Typically, the web page will be served by tricking the end user into requesting that web page by clicking on a link in a "phishing" email, through DNS attacks, or via some other method of directing a user to a web page. The servers hosting fraudulent pages are generally shown by the boxes 102, 103.

Figure 1B:
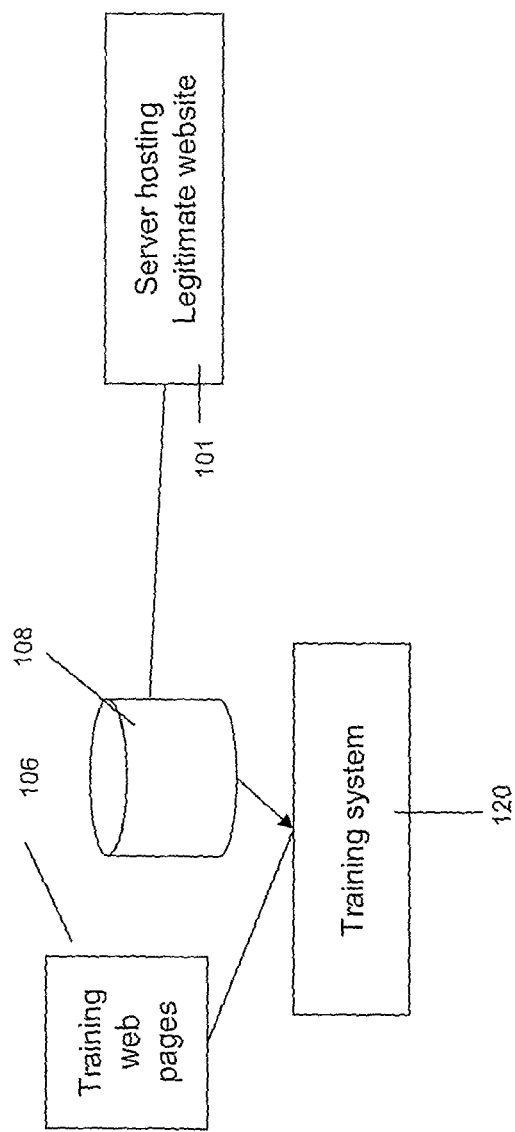
FIG. 1b is a block diagram of a training system for generating databases for use in the system.

Referring to FIG. 1b, each server providing legitimate pages, e.g. 101, can provide a token database and plug in for use by end user client PCs 105 for determining if a downloaded web page 109 is a fraudulent page or a legitimate page. The server 101 stores a database 108 comprising information forming the token database 108 (also termed herein: "database") that can be downloaded onto the client PC 105. Further, the server 101 can provide a "plug in" tool to an end user PC. The PC's browser can use this to assist in detecting fraudulent pages using the token database and optionally, providing a warning and/or rejecting that page. The information in the token database is generated by a training system 120 and stored in the database 108. The training system 120 typically (although not necessarily) will be a separate computer or system to the server 101, that is located remotely or at the same location. The training system 120 is fed training web pages 106 that are used to generate the token database 108. Each server 101, 120 etc. will receive or have access to a token database 108 of its own, which can be generated using its own training system (like 120), located remotely, locally or centrally.

Referring to FIGS. 1a, 1b, by way of overview, the system operates in the following manner. Each entity (i.e. web page provider) of the system operates a legitimate website or page provided from a server, e.g. 101, 110. For each server, e.g. 101, the training system 120 for that server 101 generates information on the likelihood of particular tokens (e.g. words, parts of words, icons, and the like) being in a fraudulent page or a non-fraudulent page. The respective training system 120 for each entity generates this information (token database) from a corpus of training pages 106 relevant to the particular entity's website. The information is stored in the database 108. This token database 108, and the plug in tool can be downloaded (at an appropriate time to be described later) by an end user PC 105 for use on their browser. When a client computer 105 accesses a web page, it extracts tokens from that web page. The client computer 105 then uses the token database 108 to determine if the downloaded web page is likely to be a fraudulent or non-fraudulent page.

It will be appreciated that the system might comprise the server or servers for one or more customers, the interact and client computer combination, and/or the training system. Alternatively, the system might comprise some part thereof. So, for example, this system as described for analyzing web pages on a client PC, could also reside on an organization gateway server, or as part of a managed service analyzing web traffic for multiple servers (in the cloud), or at the level of an ISP (Internet Service Provider), to analyze web traffic passing through such system. In such cases, the plug in and token database are not downloaded onto the client PC, but similar functioning and database or multiple databases (providing protection for multiple entities) operates on the organization server, on the managed service server, or on the ISP server.

Figure 2:
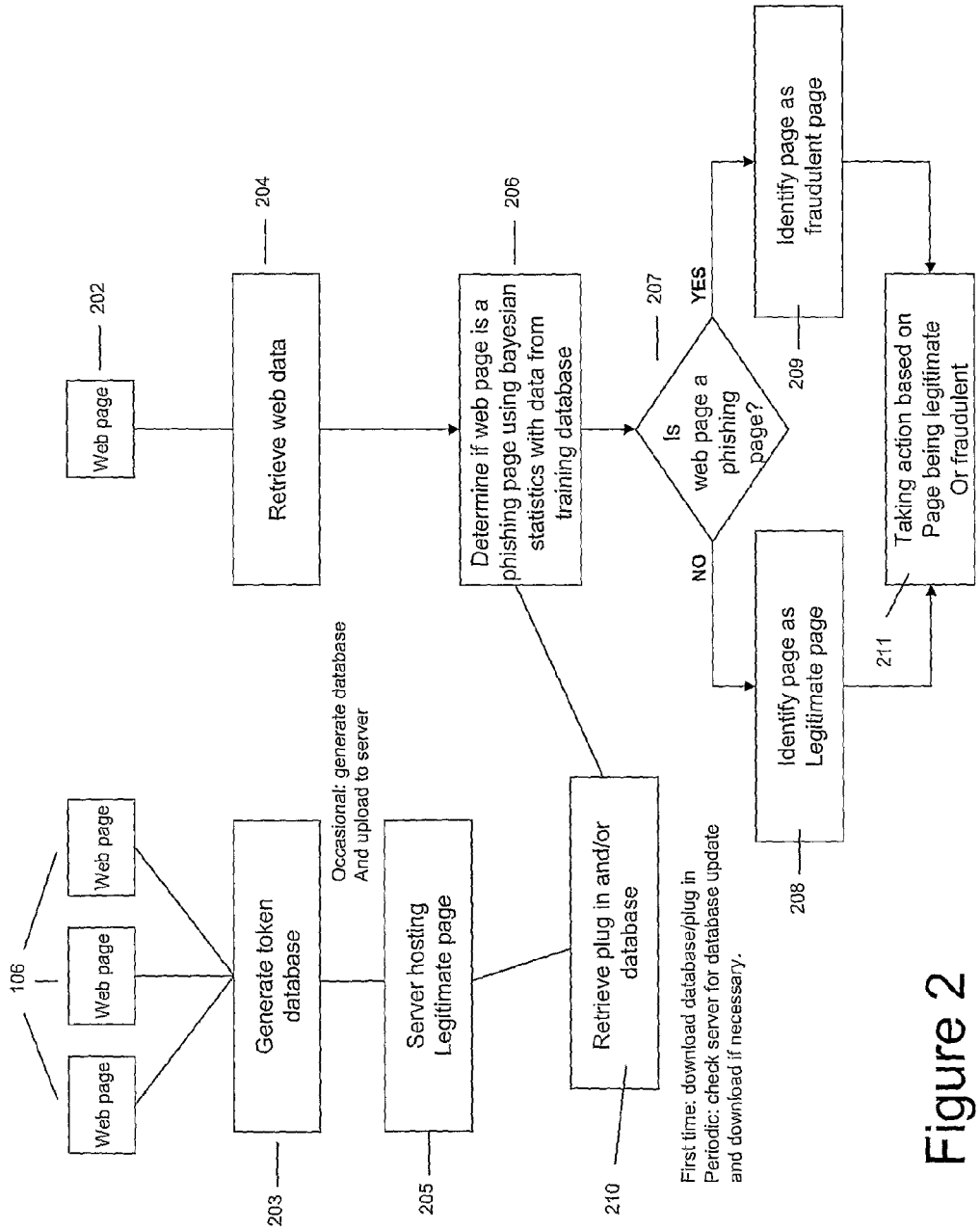
FIG. 2 shows a general overview of a method for detecting fraudulent pages.

FIG. 2 shows a general overview of the method implemented by the system as a whole.

The system and/or method can be operated or provided by any entity that provides genuine web pages to their customers, the customers being end users on client computers that access their services via the internet. Each entity provides a service or good that for purchase requires the user to enter passwords and/or other sensitive information. Such entities are at risk of having their web pages mimicked by criminal entities who wish to trick their customers into providing sensitive information via a fraudulent page. Each genuine entity has an interest in ensuring that this does not happen, to protect the credibility and also protect their customers from inadvertently providing their sensitive information to a criminal entity.

Referring to FIG. 2, each entity 205 providing genuine pages generates a respective token database 108 using a training process, step 203, using a training system 120 such as that shown in FIG. 1b. This token database comprises a number of tokens and for each token the number of fraudulent and non-fraudulent pages that that token occurs in. The training system 120 generates this information 203 by training itself on a number of training web pages 106. These web pages are usually provided by the entity and could be pages that are deliberately generated for training purposes, or could be real web pages obtained from the internet. Each of the training web pages will be known as being either a fraudulent page or a genuine page. These pages 106 form the training corpus. The database could also be provided by a third party.

Once an entity or third party has generated a token database, this together with the plug in can be downloaded 210 by end users for use on their PC browser 105. The token database is downloaded by each end user PC 105 once for each entity. This download occurs when the end user decides that they need protection for fraudulent pages mimicking the genuine pages of the respective entity. Alternatively, it might occur when the entity demands that the end user utilises the detection facility, thus obliging the end user to download the database for that entity. The first time the end user uses the facility in respect of any entity, it will also download 210 the plug in tool from that entity. This plug in tool can then be used in conjunction with the database of any entity, so it only needs to be downloaded once. An end user PC 105 will generally have a number of databases 108, each one relating to an entity that serves genuine pages. Using the tool in its browser and the databases, the end user will be able to detect fraudulent pages attempting to mimic any one of the genuine pages of the entities for which the end user has a database.

Databases for entities are downloaded in the first instance as and when they are needed. Once a database has been downloaded for a particular entity, it is generally not necessary to download another database for that entity. However, occasionally it will be required after the database has been updated. This could occur, for instance, when the entity changes the nature of their website, or if the techniques are changed for serving fraudulent pages. In these cases the existing database might not properly detect fraudulent pages. The entity or a third party will use the training system to update the database on new training pages 106, when the need arises. Periodically, (such as once a day, when the browser logs on to the internet), the plug-in will check in with each entity server e.g. 101 (for which the PC 105 already holds a database) to determine if an updated database is required for that entity. If it is (which will usually only be occasionally), it will download 210 the latest database 108 that has been generated by the training system for that entity. This replaces the existing database previously downloaded for that entity.

The following happens when an end user tries to access any web page via their client computer 105. First the client computer retrieves 204 a web page 202 via the internet. The web page may or may not be a fraudulent page and this will be unknown to the end user. The plug in comprises a software tool for utilizing the database information on the retrieved web page to detect if it is fraudulent or not. The browser then invokes the plug in tool 206 to determine if the downloaded web page 202 is fraudulent page, using the token databases 108 for all entities and Bayesian statistical methods. The determination process will be described in detail later. The tool then comprises taking action depending on the nature of the page, step 211. The tool may just simply advise the end user of the nature of the page, 208, 209, depending on the outcome of a decision 207. However, alternatively, if the software tool determines that the downloaded web page 202 is a fraudulent page 207, then the browser will reject the page, step 211. It might do this in a number of ways. For example, it might simply not display the web page, but rather display a warning page in the browser, or it may simply display the page plus a warning, step 211. If the tool determines that the page is legitimate 208, then the browser will accept the web page, step 211, and display the web page in the browser. Other actions are possible also.

Overview of Training System/Method

Figure 3:
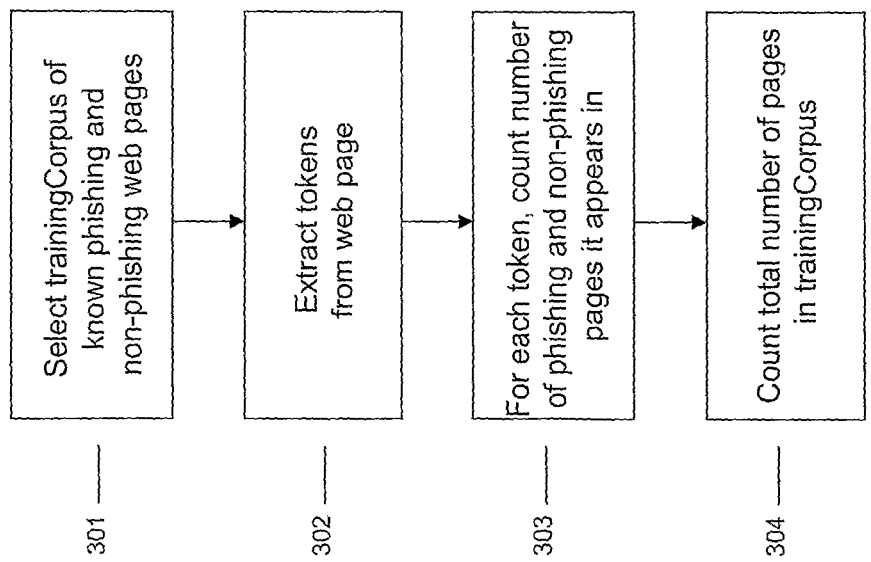
FIG. 3 is a flow diagram of a method for generating a training database for detecting fraudulent pages.

FIG. 3 shows in general terms how the information in the token database 108 is generated by the training system 120 in respect of each entity. This is done through a training process carried out by the training system 120. Each time the entity decides to carry out the training process (for example, for the first time or for a subsequent time because it made an updated web page or phishing methods have changed) it obtains new training web pages 106, step 301, from which to generate the information for the database. The web pages will generally be supplied by subscribers themselves, deliberately generated, and/or be obtained from the Internet. The pages will be known as being fraudulent pages or genuine pages and together are added to the web page training corpus, which may already have pages in it from previous training sessions.

The training system 120 then extracts tokens from the training web pages 106, step 302. Tokens will typically be words or other identifying features that can be used to determine the legitimacy of a web site. Tokens can also comprise images such as a logo displayed on the website. The tokens may be taken from all parts or just some parts of the training web pages 106. Next, the training system accumulates a count for each token, the count indicating the number of fraudulent pages and the number of non fraudulent pages respectively that the token occurs in for all the pages in the training corpus. Where training has already been done, and a particular token has already occurred in the information database, the training system 120 carries on the accumulated count from the previously known count for that token, step 303. The training server also accumulates a count of the total number of fraudulent and non fraudulent pages in the training corpus, step 304. At the end of the process the training system will have generated a token database (or updated a previously generated token database) 108 that contains an entry for each token that has been analysed, and a count of the number of fraudulent pages and the number of genuine pages that the token has appeared in for the training corpus of web pages.

The training process 301-304 can be carried out periodically as required in order to update the token database.

Optionally, the training system 120 may further determine, for each token, a probability that it will occur in a fraudulent page using knowledge of the number of times it turns up in fraudulent and non fraudulent pages. However, this step might not be done at the token database training stage, but rather by the client computer. This will be discussed in further detail below. Preferably, calculating the actual probability is done at the client computer rather than when training the token database. The reason for this is that it allows the tweaking of the probability calculation without having to do retraining.

Overview of Fraudulent Page Detection System/Method

Figure 4:
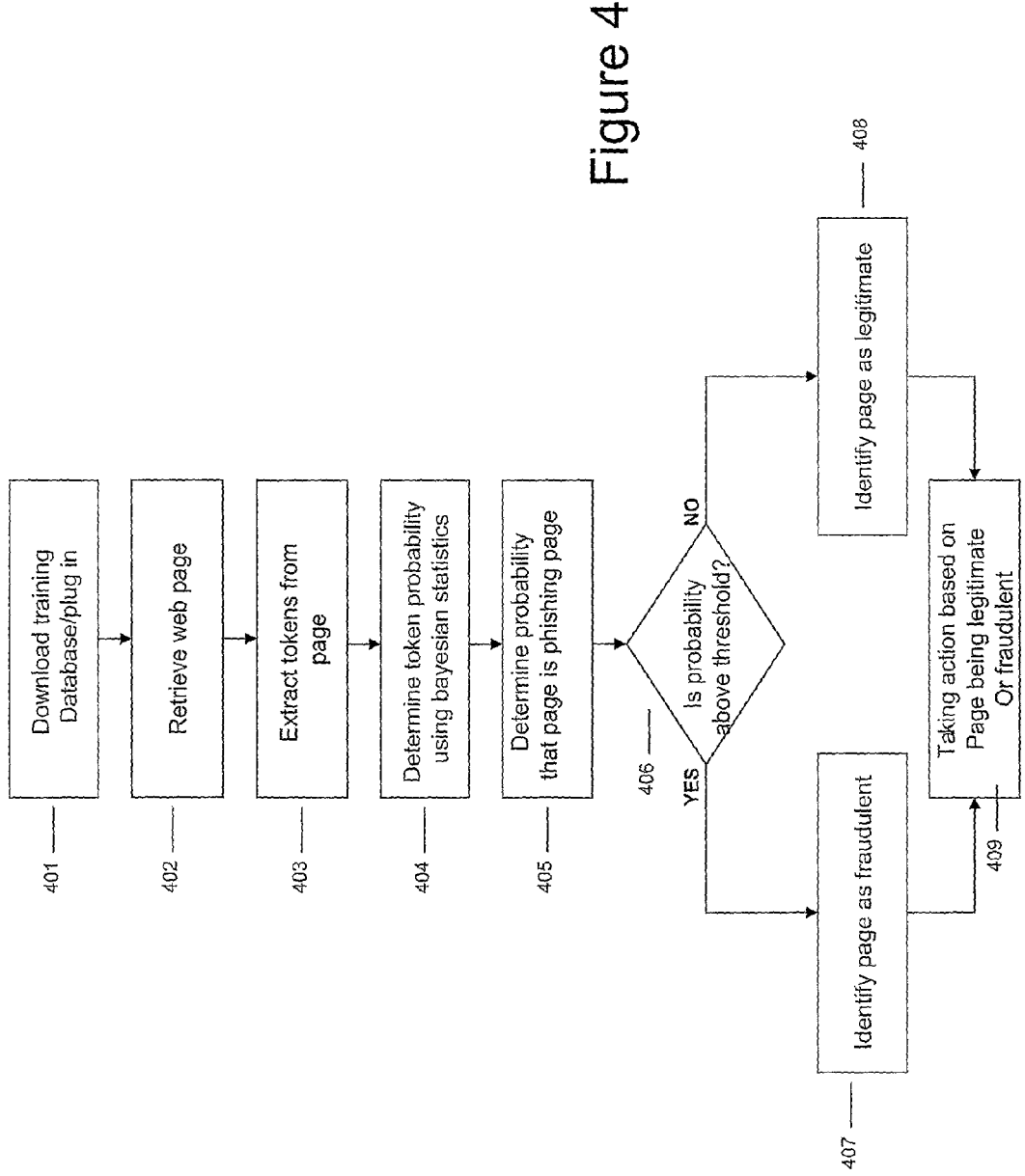
FIG. 4 is a flow diagram of a general method for detecting phishing pages using a training database.

FIG. 4 is a flow diagram showing in general terms the method carried out by a client computer 105 in trying to determine whether or not a retrieved web page is fraudulent page or not. First, the browser 107 downloads a plug in and database 401 from a server hosting a legitimate website e.g. 101. As noted previously, this is done once, upon the user determining that they want to use the facility. Updating the database is preferably done only very infrequently. As noted earlier, the end user PC 105 has a built in process that checks all the relevant web servers to see whether the respective training databases have been updated. This might be done for example once per day when the computer is connected to the internet. Only when a database has been updated is it normal for the end user PC to download an updated database for that entity.

It is now assumed that the end user PC 105 has the updated databases loaded for all relevant entities and has the plug in tool. If the user wants to view a web page, the browser 107 in the client computer 105 retrieves a web page 202, step 402, upon a user entering a URL or clicking on a link to the web page. The web page that is retrieved could be any web page available on the web, either with password/data entry fields or without. The plug in tool then extracts tokens from the retrieved page, step 403. It then, for each token, determines a token probability, being a probability that that token exists in a fraudulent web page. The plug in tool determines the token probabilities using Bayesian statistical methods. Preferably this step is carried out by the plug in tool on the client computer 105. However, as mentioned previously the token probabilities could be determined during the training process and then form part of the token database. In this case, the client computer would simply use the token probabilities as previously determined.

Using the token probabilities determined for the tokens from the retrieved page, the plug in tool then determines a page probability, step 405. The page probability is the probability calculated that the retrieved page is a fraudulent page. The plug in tool then determines from the page probability whether the retrieved page is a fraudulent page, for example by comparing their probability to a threshold, step 406. For example, the page probability might be between 0 and 1.0, 0 indicating the page is not similar to the genuine page at all, and 1.0 meaning that the page is exactly like the genuine page. (This could be because it is a genuine page, or a fraudulent page that is an excellent copy of a genuine page). If the page in question has a URL that is different to the genuine page URL, and the page probability is within a defined threshold of 1.0 (say 10%), then it will be flagged as a fraudulent page. If the page probability is outside the threshold (say 0.8), it will be deemed different enough that the page is not trying to mimic the genuine page and so is not fraudulent, but rather just another web page altogether. If the page probability is 1.0, but the URL is the URL of the genuine page, then it will be the genuine page.

If the web page is flagged as fraudulent, at this point the user may be simply alerted to the nature of the page, steps 407 or 408. However, preferably the software also acts on this information, step 409. For example, if the plug in tool determines that the retrieved web page is not a fraudulent page, then the browser will display the retrieved page, step 409. If the plug in tool determines that the retrieved page is a fraudulent page, step 407, then it will reject the web page, or disable the entry fields, and/or provide a warning to the user, step 409. In addition, preferably, when a fraudulent site is detected, the method comprises immediately electronically notifying the owner of the legitimate site and/or the fraudulent blacklist sites are also notified, step 409.

Detailed Description of One Embodiment of Training Method

Figure 5:
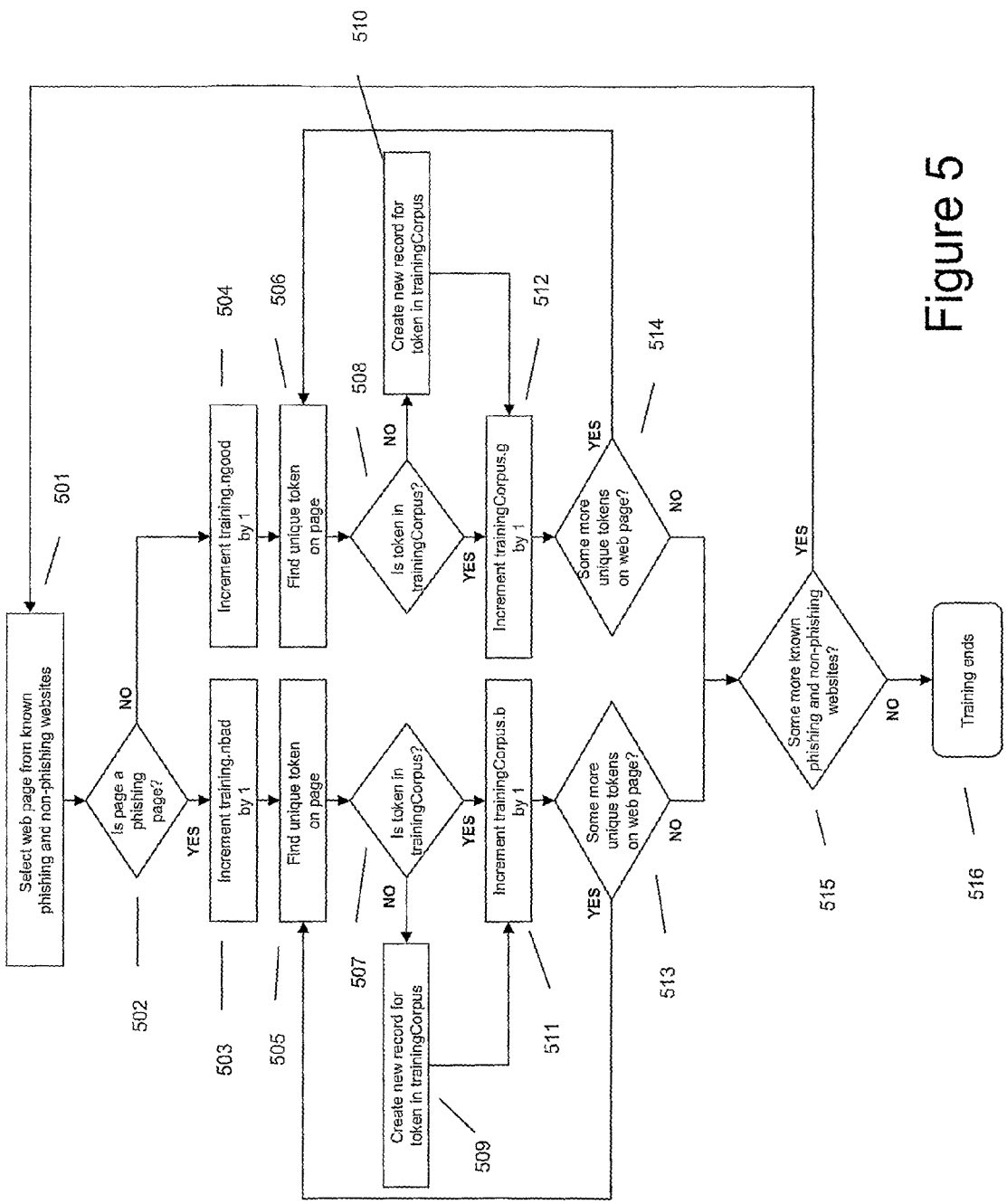
FIG. 5 is a flow diagram of a preferred method for generating a training database.

A possible embodiment for a training method for generating the token database is described in further detail in FIG. 5. Psuedo code showing how this method is conducted is set out later.

The method is implemented by software on the training system 120. The method comprises first selecting web pages for the training corpus 106, step 501, wherein each web page is known as being a fraudulent or a non fraudulent page. The pages can be obtained from the internet, or alternatively generated to look like fraudulent and non fraudulent pages. Alternatively, a particular entity who wants their customers to be protected from fraudulent pages could supply the training process with genuine pages of their own, plus fraudulent pages they have generated themselves, or obtained from other sources. For each training page in the training corpus, the method comprises taking each page in turn. The tokens from the pages are extracted.

If a page from the training corpus is a phishing page, step 502, then a count (training.nbad) of fraudulent pages is incremented by one, step 503. This provides a running count on the number of fraudulent pages that make up the training corpus.

For each token in the page, step 505, the method comprises determining if that token is already in the token database 108, step 507. This will have occurred if the token has already occurred in another page during a same or previous training session. If the token is not already in the database, a new record is created for the token in the token database, step 509. Once the token record is created, or if the token record has already been created, the method then comprises incrementing a count (trainingCorpus.b) by one, step 511. This count is then associated with the token record and the token database 108. The count gives an indication of the number of times that particular token has occurred in a fraudulent web page. The method then continues to determine if there are more unique tokens in the fraudulent web page that have not yet been processed, step 513. If there are, then the token record is updated to increment the total count of the number of times that token has occurred in a fraudulent page, or that record is created if it does not already exist. This continues until all tokens on the fraudulent page have been completed, step 513.

In the alternative, if the page selected from the training corpus that is currently being processed is a non fraudulent (genuine) page, step 502, then the following process is undertaken. First, the count of non fraudulent pages in the training corpus (training.ngood) is incremented by one, step 504, to give a total count of the number of non fraudulent pages in the training corpus. For each token in the page, step 506, the method comprises determining if that token is already in the token database 108, step 508. This will have occurred if the token has already occurred in another page during a same or previous training session. If the token is not already in the database, a new record is created for the token in the token database, step 510. Once the token record is created, or if the token record has already been created, the method then comprises incrementing a count (trainingCorpus.g) by one, step 512. This count is then associated with the token record and the token database 108. The count gives an indication of the number of times that particular token has occurred in a genuine web page.

The method then continues to determine if there are more unique tokens in the genuine web page that have not yet been processed, step 514. If there are, then the token record is updated to increment the total count of the number of times that token has occurred in the genuine page, or that record is created if it does not already exist. This continues until all tokens on the genuine page have been completed, step 514.

Once a page has been processed, either as a fraudulent page or a non fraudulent page, the method then comprises determining if there are any further pages in the training corpus that have not yet been processed, step 515. If there are, then the process carries our for the remaining training corpus pages. If not, training ends in the token database training or update is completed, step 516. The training can occur at a later date again, either periodically or as required, to update the token database as and when new pages arrive for training.

Once all the pages have been processed, the token database has a record for all the tokens found in those pages. Each token found on those pages will have an associated count—being the number of times it occurs in fraudulent and non-fraudulent pages.

Detailed Description of One Embodiment of the Fraudulent Page Detection Method/System A probability is then determined for each token, being the probability that in the general case that token exists in a fraudulent/non-fraudulent page. While not essential, this is usually carried out at the time of page retrieval when the plug in tool is determining whether or not a retrieved page is fraudulent. Therefore, the token probability determining will be described in this context by way of example. Psuedo code showing how this method is conducted is set out later.

Figure 6:
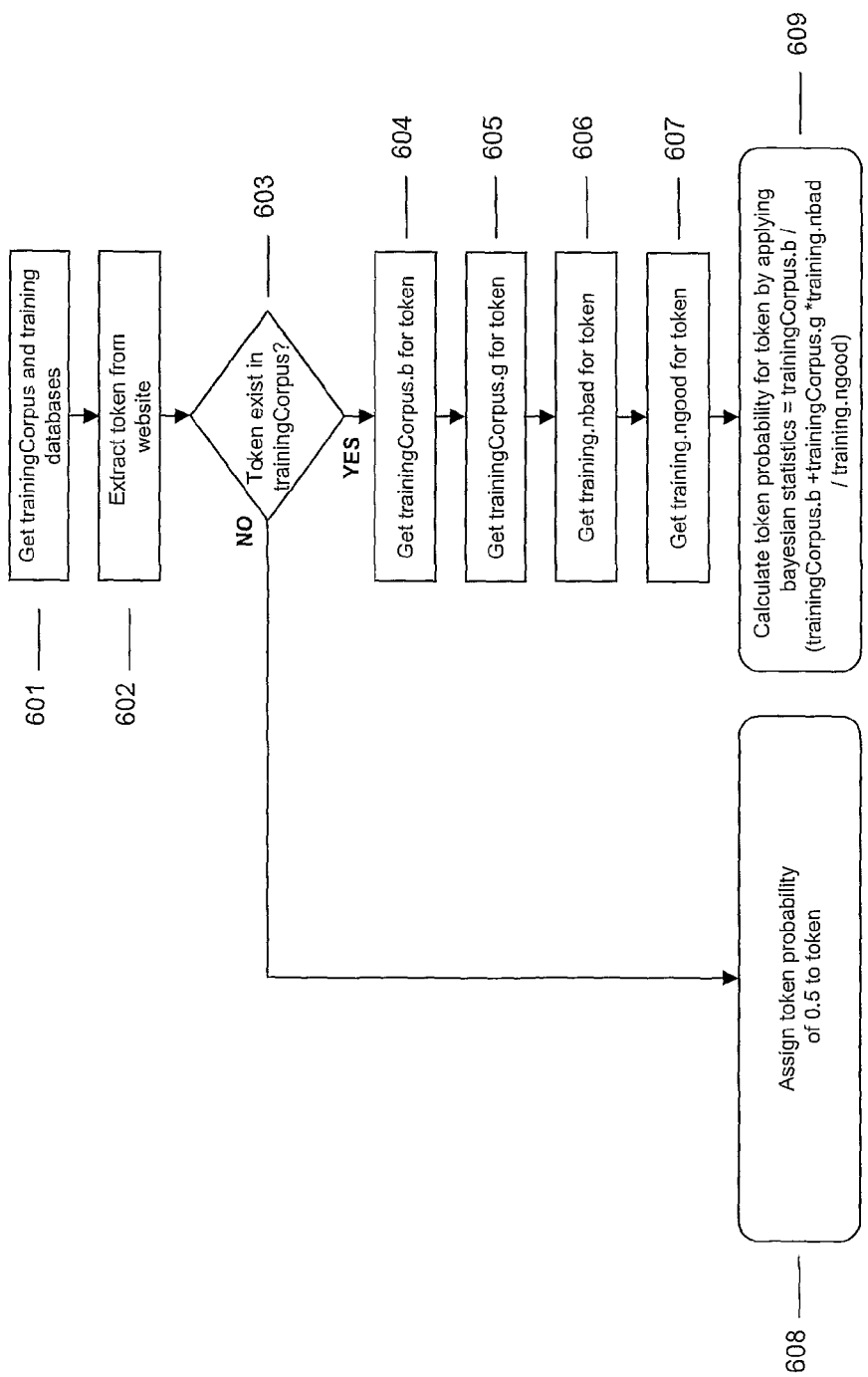
FIG. 6 is a flow diagram of a preferred method of detecting if fraudulent page.

The method for determining token probabilities using Bayesian statistics (as per FIG. 4, step 404) is shown in further detail in FIG. 6 with reference to FIG. 4. As noted above, this is preferably carried out by the plug in on the end user PC 105 at the time the PC is determining whether a retrieved page is fraudulent or not as per the method described with reference to FIG. 4. The token database for the retrieved page (which at this point has not been identified as fraudulent or non-fraudulent) is obtained, and its URL determined. If the URL is not one of the URLs of genuine pages forming part of the system, then the page checking process starts. Tokens are extracted from the retrieved web page, steps 402 and 403 from FIG. 4. Determining token probability using Bayesian statistics, step 404, is then carried out in the following manner. First the method comprises determining if the token exists in token database (also training corpus), step 603. If it is not, then the token is assigned a default token probability, preferably 0.5, step 608. If the token does exist in the token database, step 603, then the method comprises obtaining from the token database the count of the total number of fraudulent pages that contained this token, from the training corpus (trainingCorpus.b), step 604. Next, the total number of non fraudulent pages that contain this token is obtained (trainingCorpus.g), step 605. Further, the total numbers of both the fraudulent and non fraudulent pages in the training corpus (trainingSet.nbad and trainingSet.ngood) is also obtained, steps 606, 607.

The method then comprises determining the token probability, step 609, from the following equation:

$$\text{Probability} = \frac{trainingCorpus.b}{trainingCorpus.b + trainingCorpus.g * \frac{trainingSet.nbad}{trainingSet.ngood}}$$

This can also be represented as $$\text{Probability} = \frac{trainingCorpus.b * training.ngood}{trainingCorpus.b * trainingSet.ngood + trainingCorpus.g * trainingSet.nbad}$$

This equation being determined using Bayesian statistics.

This process, steps 601 to 609, is then carried out until all the tokens for the page have been extracted, and the token probability for each calculated as per step 609.

Figure 7:
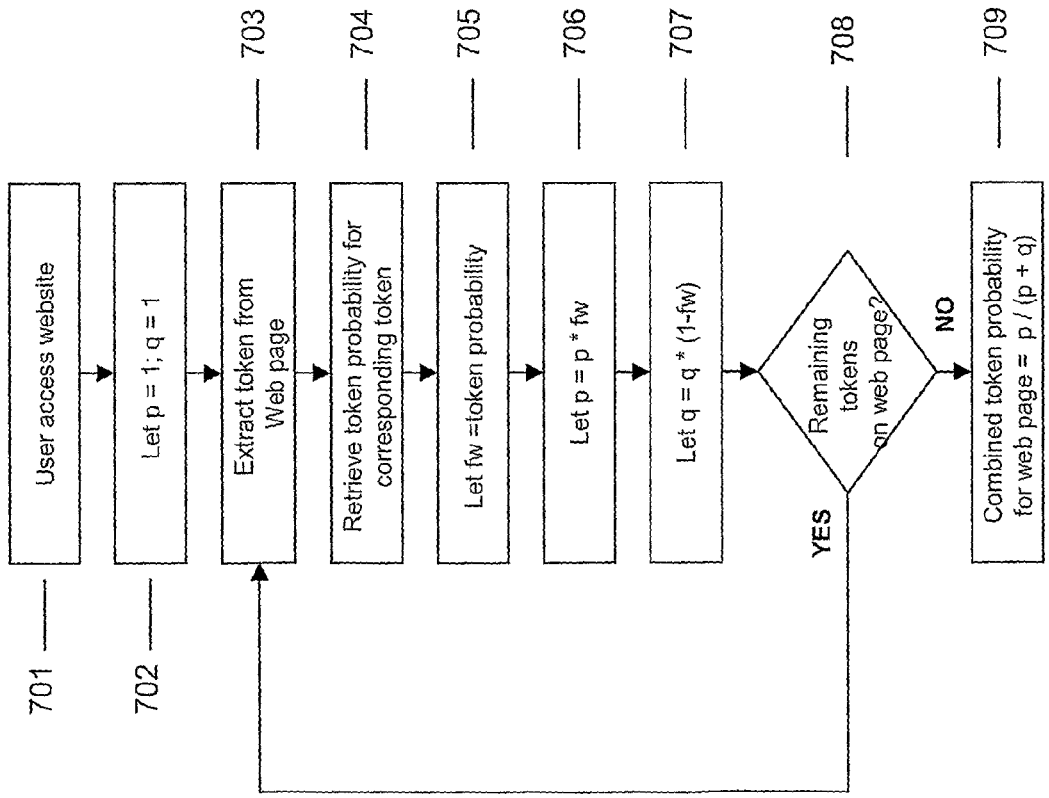
FIG. 7 is a flow diagram showing a preferred method of generating training database in more detail.

The token probabilities for all the tokens in a particular retrieved web page can then be utilised to determine the page probability (carried out in step 405 of FIG. 4) in the following manner. Referring to FIG. 7, first, default probabilities p and q are set at 1, step 702. Then, for each unique token in the web page, the following is undertaken. First, the token probability that was calculated for that token (fw) (in accordance with steps 601-609 of FIG. 6) is obtained, step 704. This token probability fw is then multiplied with the current value of token probability P, step 705, 706. Next, the second probability q is found by multiplying the current value of token probability q with (1−fw), step 707. If there are remaining tokens on the web page this process is carried on until all are finished, step 708. Finally the page probability is found as being the following:

$$\text{Page\_probability} = \frac{p}{p+q}$$

This provides a page probability of between 0-1.0 for determining the probability that the particular web page is fraudulent (assuming that the URL is not one of a genuine page), as per steps 406-408 of FIG. 4. If the calculated page probability is greater than a threshold (e.g. greater than 0.9), then the page is determined as a fraudulent page (if a test of its URL location proves not to be the real location)—this is because its similar enough to the genuine page to be likely to be acting as a fraudulent page. Otherwise, if the page probability is less than a threshold (e.g. 0.9) it is considered to be another page entirely and therefore a legitimate page. Options can then be taken as to how to react if the page is determined as fraudulent. Optional decisions can be undertaken which may alter this page probability, as will be described below.

The preferred embodiment as described above provides a method for detecting whether or not a retrieved page is fraudulent based on tokens extracted from the retrieved web page.

Figure 8:
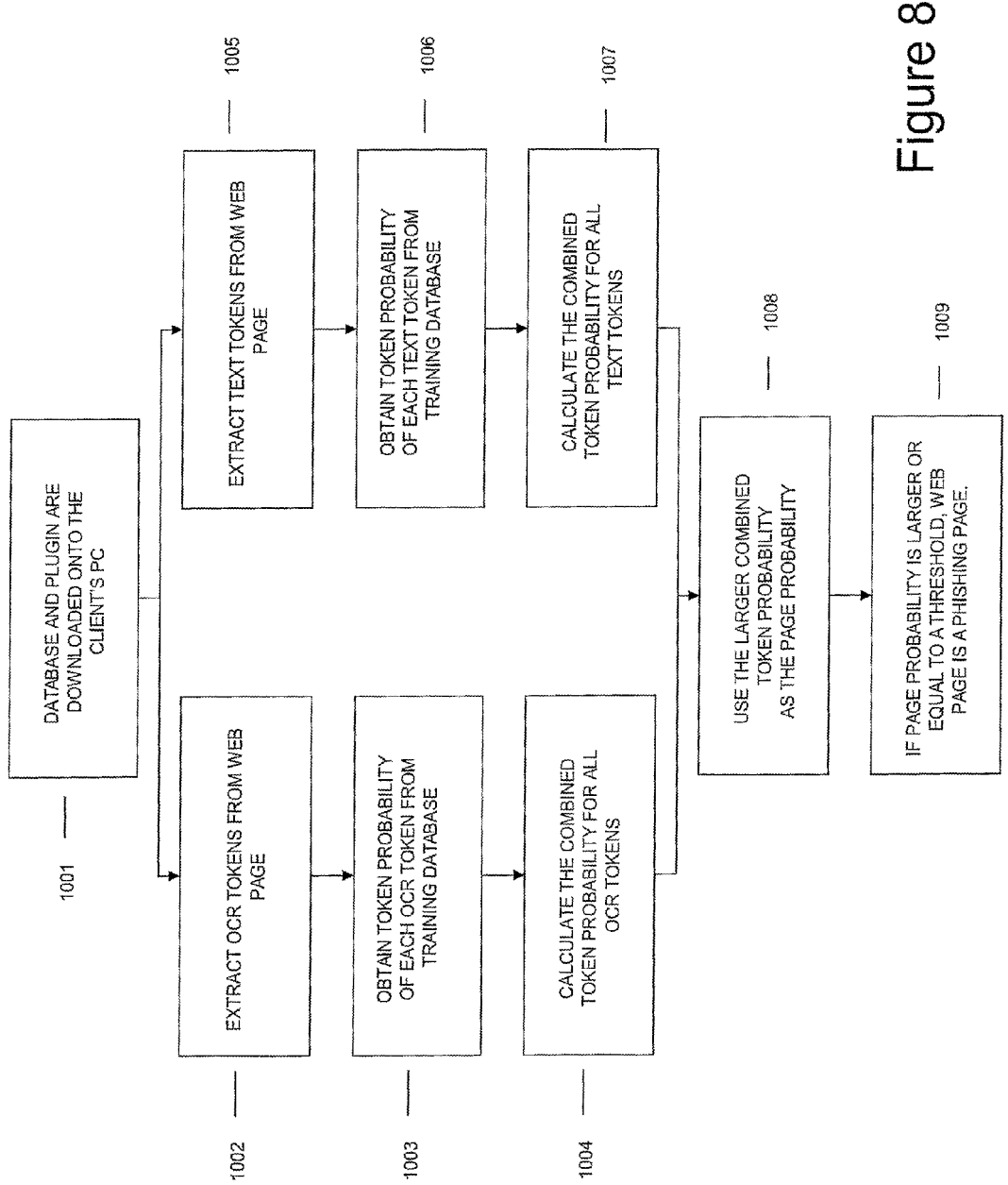
FIG. 8 is a flow diagram showing a general method of using the fraudulent page detection in a software tool for detecting phishing pages.

Detailed Description of Alternative Embodiment of the Fraudulent Page Detection Method/System Another embodiment of the invention enables extraction of tokens in different ways, as shown in FIG. 8. In this embodiment the computer of the end user downloads a database and plug in the usual manner as described above and also retrieves a web page. The plug in operates in a similar manner to that described above; however, two different approaches are taken to extract tokens from the web page. A first method for obtaining tokens comprises extracting the text of the page, or a frame of the page and also extracting the text from the title of the page, step 1005. This includes extracting individual words and the title as an entire phrase. The text is obtained from the page or frame or title, but not the raw HTML or other mark up language. Tokens are extracted from the text using a suitable method. Next, each extracted token has its token probability calculated, in the same manner as that described for the embodiment above, step 1006. Then, the page probability is calculated from the token probabilities for all the tokens extracted from the page, step 1007.

As well as extracting tokens from text, the plug in tool extracts tokens in another manner. It first takes an image of the retrieved page and then performs optical character recognition on it along with the title of the page, step 1002. This turns the page image into a set of characters, from which tokens can be extracted. Again a token probability is obtained for each extracted token, step 1003, and from those the page probability is found, step 1004. Using this method may extract tokens that would not otherwise be found from text alone. The plug in tool then determines which page probability is the largest, the one determined from OCR extracted tokens, or the one taken from text extracted tokens, step 1008. If the selected page probability is larger than a threshold, the plug in determines the page as being a fraudulent page, step 1009.

Tokens can also take the form of images, which can be extracted from web pages, and also stored as tokens in the token database, with associated token probabilities. Image comparison can then be used whereby the image extracted from a page is compared to an image token in the database to determine the probability the token has occurred in a fraudulent page. For example, it is possible to include the genuine organisation's logo in the analysis, whereby if the page is not the legitimate page, its presence will indicate greater likelihood of the page being a fraudulent page.

Various methods for detecting fraudulent pages mentioned above can then be used in combination with other methods to detect and reject fraudulent pages. Additional methods can be added to increase the accuracy of the method.

Figure 9:
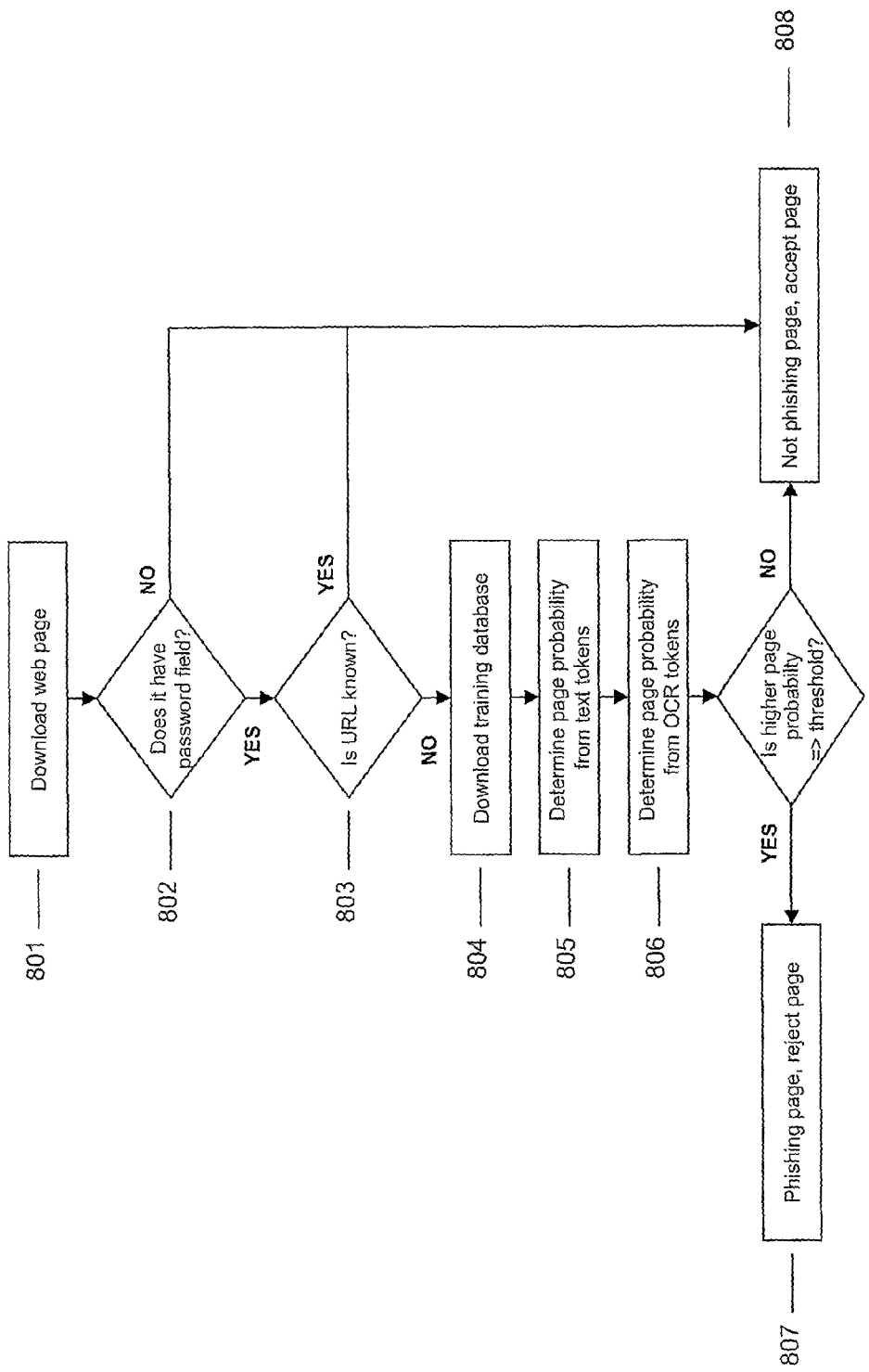
FIG. 9 is a flow diagram showing software tool in further detail.

Once such more preferred method is shown in FIG. 9. In this embodiment the client computer 105 downloads a page in the usual manner, step 801. First the browser parses the page and/or frames of the page to determine if there is a password input field in the page or frames, step 802. If there is not a password field, then the page probability is considered 0% and the page is not considered a fraudulent page and is displayed in the usual manner, step 808.

If the page or frame contains a password input field, the browser then determines if the page has been accessed over secure HTTP, and the URL of the page or frame is from a trusted source, by checking a whitelist of server hosts contained in each database, step 802. Alternatively, it could determine if the URL is that of a genuine page using a digital certificate or any other technique that confirms it is a legitimate page, step 803. If it is has, then the page probability is considered 0 and the page is not determined as being a fraudulent page and it is displayed in the normal manner, step 808. If the URL is not known and/or the page has not been accessed over secure HTTP then the plug in obtains the training database (if necessary), step 804, extracts tokens from the text of the page, and obtains token probabilities, step 805, and then determines the page probability, step 806, as described previously. The plug in then turns the page into an image and performs optical character recognition to extract tokens, and determines token probabilities and page probability as described previously.

Next, the plug in determines if any of the page probabilities are over a threshold (e.g. 0.9 on a scale of 0-1.0) then the page is determined as being a fraudulent page and is rejected, step 807 (assuming the URL is not one of a genuine page). Otherwise the page is displayed, step 808.

The above flow diagrams show what occurs in a logical sense, although the exact order of steps and process may differ. The pseudo code for carrying the embodiment in FIG. 9, along with training the token database, finding token probabilities, and determining a page probability, are shown below.

| Table | Field | Description |
| --- | --- | --- |
| trainingSet | name | Company Name |
| | threshold | Threshold at which the page will be treated as a phishing page (0-100) |
| | ngood | number of non-phishing pages that have been used for training |
| | nbad | number of phishing pages that have been used for training |
| Whitelist | host | if the page has been accessed from host over https, give the page a 0% probability |
| trainingCorpus | tokenId | foreign key to token table |
| | G | number of non-phishing pages that contained this token |
| | b | number of phishing pages that contained this token |
| Token | id | primary key |
| | token | string token |

Training Token Database
  W Tokens being trained on
  P Indicates whether the page being trained on is a phishing site (true) or not (false)

```
Train(W, P)
    if P = true
        increment training.nbad by 1
        for each unique token T in W
            if T is present in trainingCorpus
                increment trainingCorpus.b by 1 where trainingCorpus.token = T
            else
                insert a new record into trainingCorpus with (token, g, b) =
                    (T, 0, 1)
    else
        increment training.gbad by 1
        for each unique token T in W
            if T is present in trainingCorpus
                increment trainingCorpus.g by 1 where trainingCorpus.token = T
            else
                insert a new record into trainingCorpus with (token, g, b) =
                    (T, 1, 0)
```

After all training has completed, all records in trainingCorpus, where the TokenProbability (see below) is between 0.4 and 0.6 are removed from the database—these tokens don't have a significant impact on the calculated probabilities.

Token Probability
  Calculate the probability of the token being in a phishing page using Bayes Theorem
  T The token for which the probability is being requested

```
TokenProbability(T)
    if T exists in trainingCorpus
        return trainingCorpus.b / (trainingCorpus.b + trainingCorpus.g *
training.nbad / training.ngood)
            where trainingCorpus.token = T
    else
        return 0.5
```

Calculating Phishing/Page Probability
  Calculate the combined probability of the tokens
  W Tokens for which the probability is being requested

```
PhishingProbability(W)
    let p = 1
```

```
        let q = 1
        for each unique token T in W
            let fw = TokenProbability(T)
            let p = p * fw;
            let q = q * (1 - fw)
        return p / (p + q)
```

Identifying a Phishing Page
    PAGE Page being tested

```
IsPhishingPage(PAGE)
    for each trainingSet TS
        if PageProbability(PAGE, TS) >= TS.threshold
            return true
    return false
PageProbability(PAGE, I)
    if protocol of PAGE is https and host of PAGE exists in training
    whitelist
        return 0
    let p = 0
    if a password field exists in PAGE
        let wt = text tokens in PAGE
        let pt = PhishingProbability(wt)
        let wo = OCR tokens in PAGE
        let po = PhishingProbability(wo)
        let p = max(pt, po)
    for each frame F in PAGE
        let fp = PageProbability(F, I)
        if fp > p
            p = fp
    return p
```

It will be appreciated that the above pseudo code relates to one possible way to implement the embodiment—this should not be considered limiting in any way.

Each token database provides protection in relation to a particular web page or pages. Where the user for example has downloaded a database that protects against an action site fraudulent pages, they might also need to add protection against a bank. The bank will generate a token database for their web page using training web pages. This additional database can then be downloaded by the end user PC 105 for use by the tool in analysing whether subsequently downloaded pages are fraudulent. In practice, the end PC may have a large number of token databases each relating to an entity. The token databases for multiple entities are not actually merged in the preferred embodiment. The token databases for each entity are dynamically loaded from a sub directory under the install location. To avoid large training databases, the tokens could be stored in a common database, where each token database has only a foreign key to the token table relating to the relevant tokens. Each token database also has a corresponding signed catalog file that contains the hash of the database. This allows the system to detect unauthorised modifications to a database file.

It will be appreciated that the above description relates to preferred embodiments of the invention. Alternatives are possible.

Figure 10:
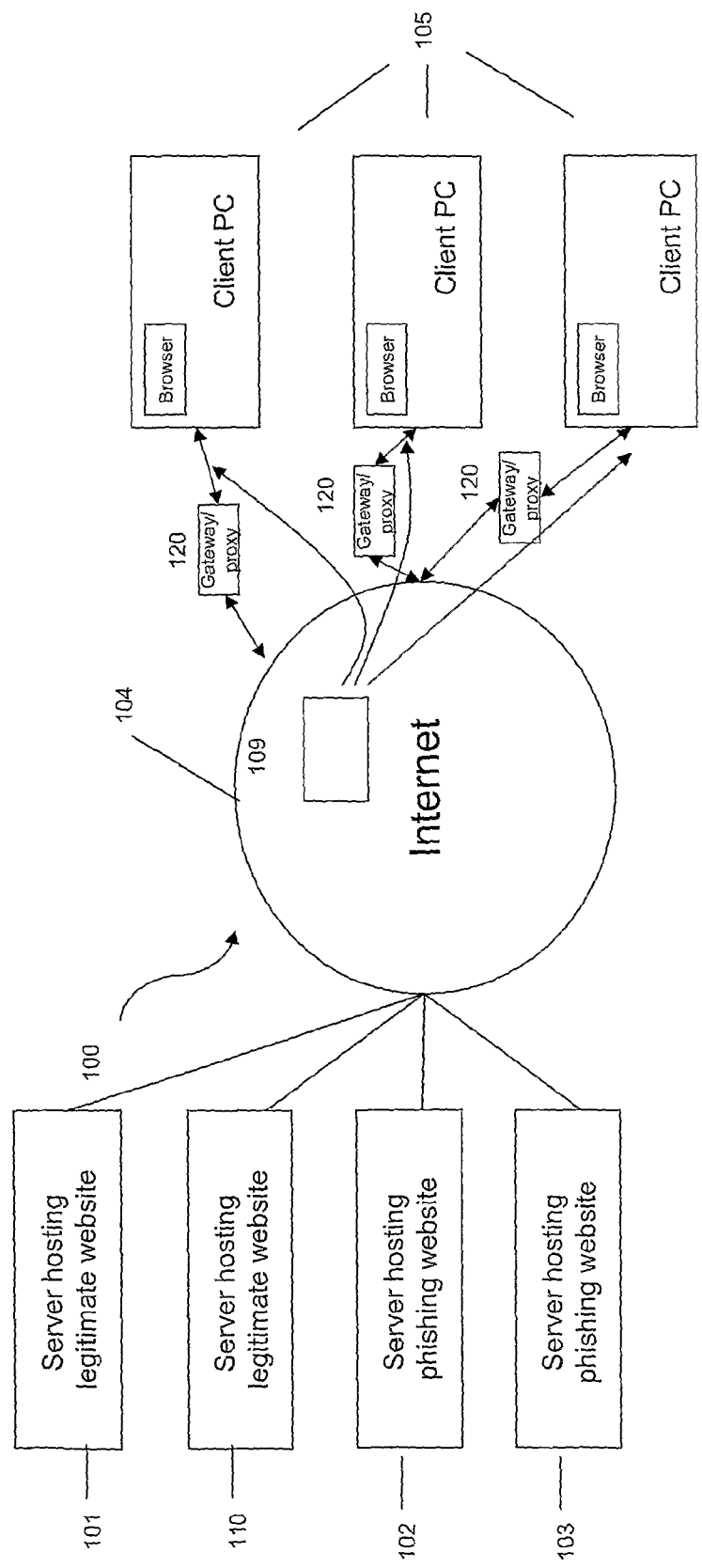
FIG. 10 is a block diagram of a system that implements fraudulent page detection according to another embodiment.

Further, referring to FIG. 10, the system could be run whereby a proxy server or gateway 120 handles the fraudulent page detection. This would work in the same manner as described above, except that detection does not occur on the end user computer, but at some point before. In this embodiment the system analyses all web sites that are accessed through the proxy or gateway 120. Likely fraudulent pages are included in the training so that the system is equipped to identify fraudulent pages at multiple sites. The system can also include pornography filtering functions whereby the database training includes information to identify likely pornography sites.

Examples of this gateway system, are those that operate at the organization gateway, those that operate through managed services for multiple organizations, those that operate at the Internet Service Provider level, and any other system though which network or internet traffic flows.

Also, the training process for generating the token database is not necessarily conducted on a computer connected to the web server. The training could be conducted on any computer that has access to the web pages from both the whitelist (genuine pages) and backlist (fraudulent pages). This training can be conducted by the entity itself, provider of the service or by another party using remote or local computer systems. The training system example shown in FIG. 2 is by way of example only.

Figure 11:
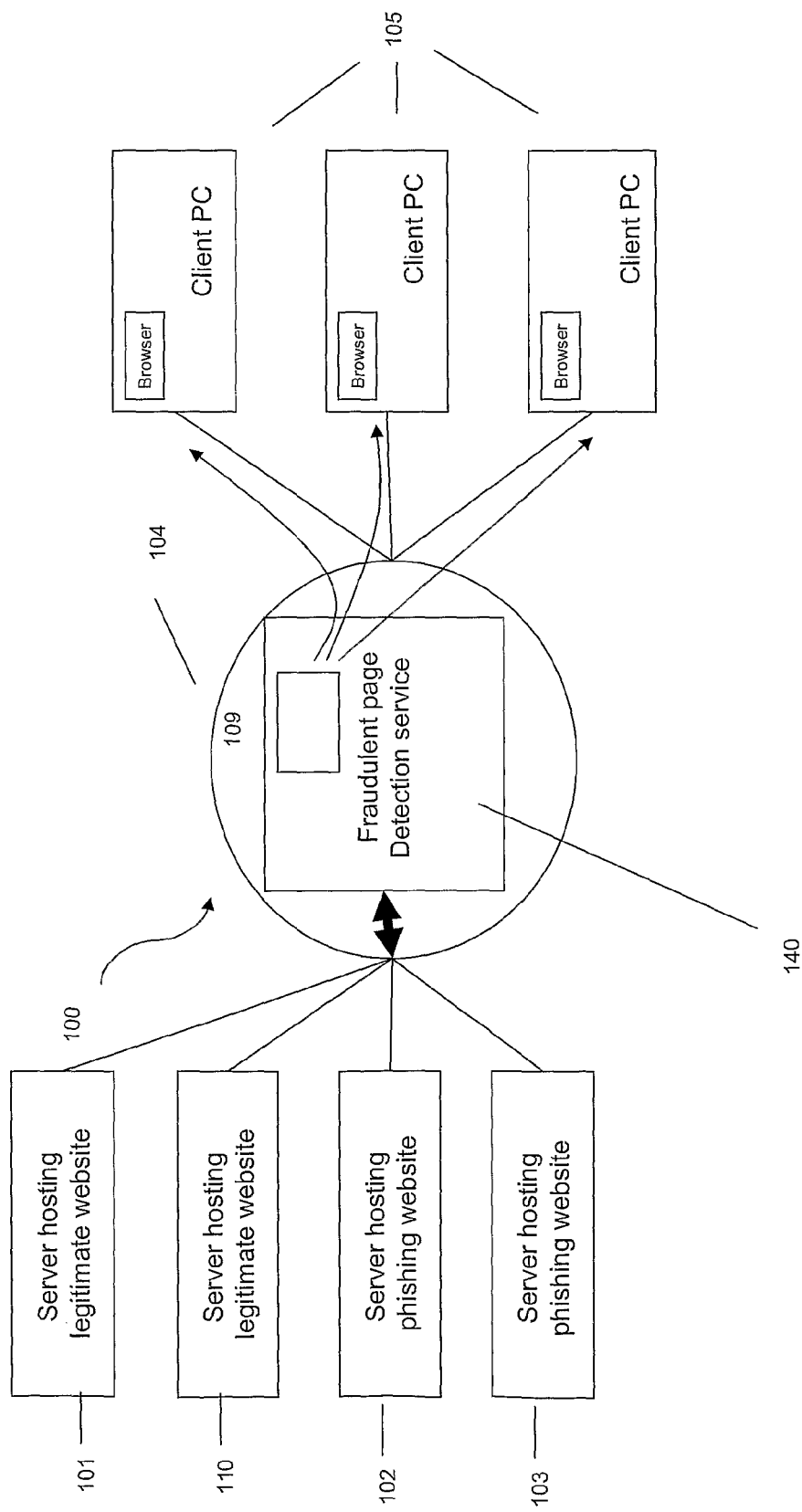
FIG. 11 is a block diagram of a system that implements fraudulent page detection according to another embodiment.

Another alternative system is shown in FIG. 11. Here, all internet traffic coming from or going to an end user PC 105 passes through a third party service. This third party service could do the processing to determine whether or not a page is fraudulent that is being requested from and passed to a PC, thin client or terminal server. The third party service 140 would download and hold the plug in and databases for multiple entities. Any web page passing through the service will be analysed using the plug in and databases, as described above. In effect, the method of the present invention is carried out by the service 140 rather than on the end user PC 105.

Figure 12:
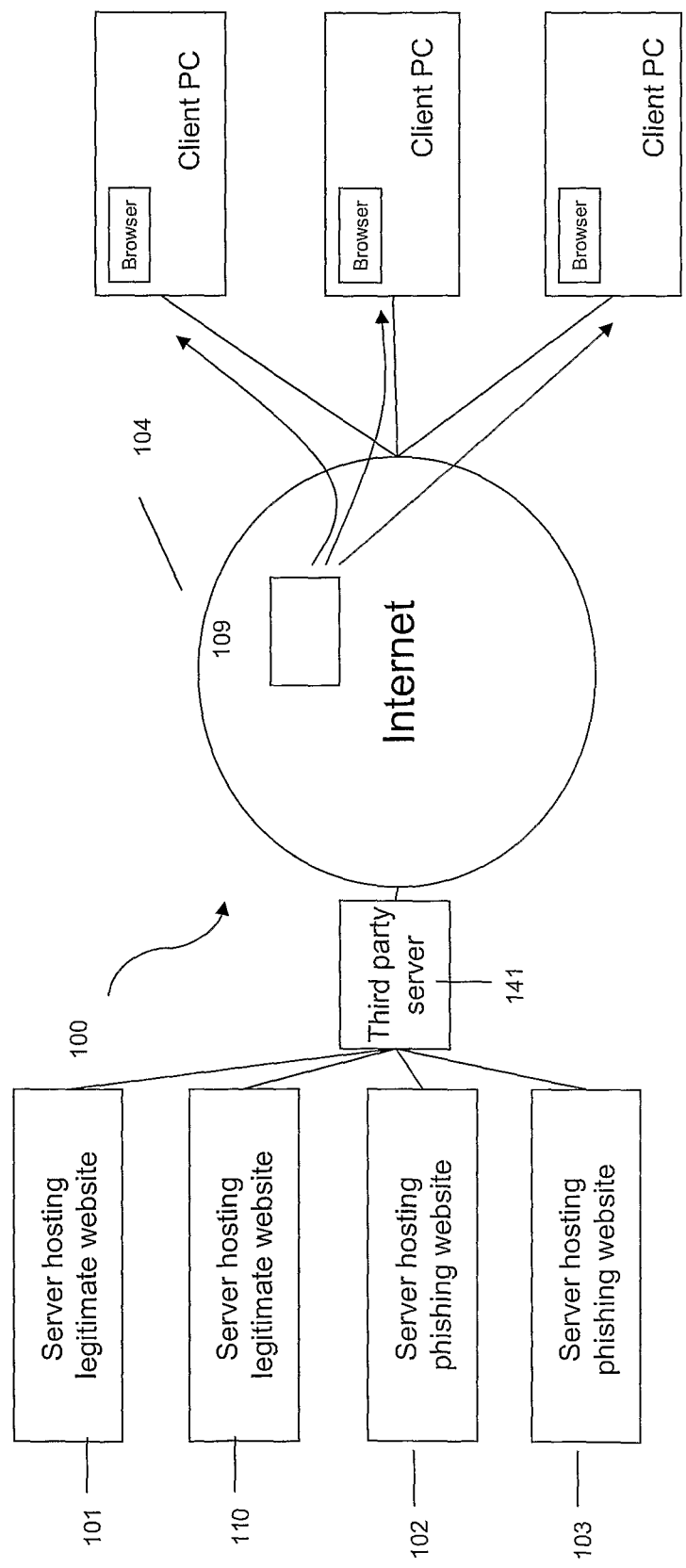
FIG. 12 is a block diagram of a system that implements fraudulent page detection according to another embodiment.

Another alternative embodiment is shown in FIG. 12. Here the databases for each entity 101, 110 are created and/or managed centrally on a third party server 141. Each participating entity would have their database hosted by the third party server. To download a plug in and/or a database for an entity would involve an end user PC downloading this from the third party server. The databases could optionally be generated by the third party server, or generated by the entities but sent to the third party server to host.

In yet another alternative, the databases for each entity could be combined into a single database. This way an end user would download one database covering all participating entities, rather than downloading individual databases for each entity. When analyzing a page, the tool would use the one database to analyse the page, rather than cycling through all the databases.

It will be appreciated that the order of the steps in the methods described are not necessarily essential. Other orders of steps might be possible, as will be understood by those skilled in the art.

It will also be appreciated that while the embodiments above focus on page probability of a page being fraudulent, the reverse could be the focus. That is, the page probability could relate to the probability of the page being genuine. Variations in the use of the token probabilities to determine which pages are fraudulent or not might be envisaged by those skilled in the art. In any of such cases, suitable thresholds can be set to determine the cut off point for a page being fraudulent. The threshold could be set such that a page probability must be higher than the threshold to determine fraudulence. Alternatively, the threshold could be set such that a page probability must be lower than a threshold to determine fraudulence. Page probability for fraudulence could even be set as a range. The nature of the threshold will depend on the exact nature of the page probability and how it is calculated.

In a further alternative, token probabilities that do not significantly affect the final page score can be excluded from the page probability calculation. For example, token probabilities of between 0.4 and 0.6 do not clearly discriminate between being in a fraudulent page and non-fraudulent, and so will not provide a large factor in determining the final page probability. Excluding these can improve the performance of the system—it can speed up the process and/or reduce the size of the training database. Clearly, another range of token probabilities, such as 0.45 to 0.55 could be used. Usually the excluded tokens will have probabilities centred around 0.5, although this is not essential.

Figure 13:
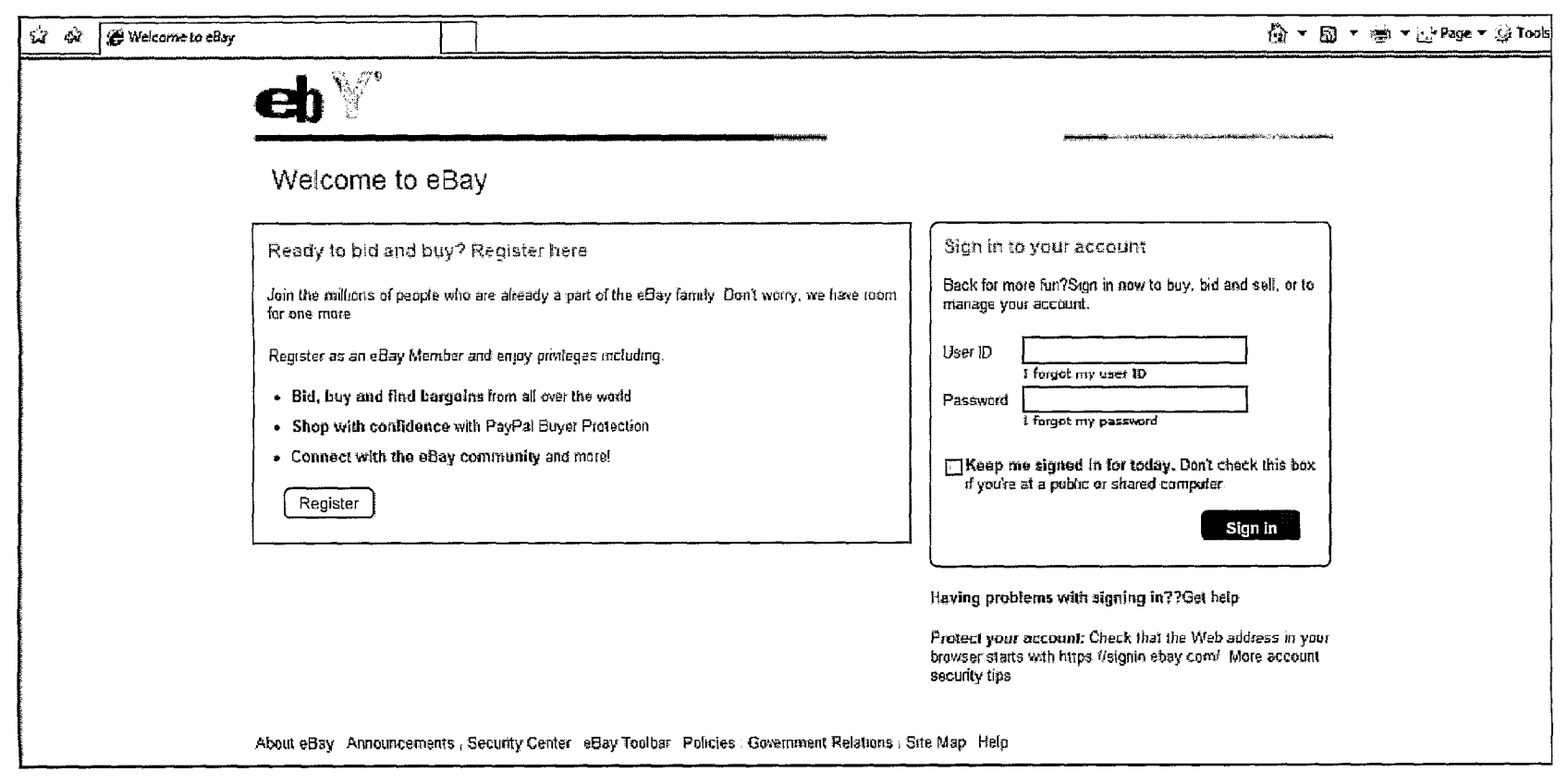

An example of how an embodiment invention works in relation to an actual fraudulent page will now be described. FIG. 13 shows a fraudulent page mimicking an Ebay® web page. It is actually fishing for UserID and password details. When a user request the page, the page is parsed and the following tokens are extracted:

Sig, Sta, acco, Sig, pub, Rig, sha, adds, Priv, Prof, Prot, Netw, alre, brow, Conn, Cen, fam, For, bra, tod, wor, wor, Hav, Pay, peo, Pol, own, man, Mem, off, sign, Relat, accep, confi, inclu, Agree, commu, Copyr, Desig, trade, consti, Announc, respe, Gover, privi, Prote, Iden, mill, offi, comp, Tool, Welc, bang, Pass, Rese, secu, Veri, Regi, Poli, prob, prop, the, Us, VI, We, th, no, on, ta, wh, fr, ha, he, fi, yo, Ba, eB, bo, bu, co, bi, al, an, ar, Do, Ke, Io, Ma, In, fo, fu, Ge, he, Buy, che, cli, Abo, wh, wi, yo, Enj, ord, Rea, Sit, lea, ext, htt, lay, pa, no, se, ov, Jo, Ke, mo, Sh, ti, ti, Us, th, Si, Si, Th There are 123 tokens that were extracted from this page. The probabilities of the tokens are calculated based on the training database, and then the page probability calculated. In this case, the page probability based on the token probabilities came to 1.0, strongly indicating that this page is very similar to the real page. If the test of the location of the page results in the page not being the genuine page, then it is concluded that it is a fraudulent page.

The invention claimed is:

1. A method of determining whether a page is a fraudulent page mimicking a page of a known genuine website, comprising the steps of:
   on a computer:
   receiving at least one token database corresponding to a genuine website, of an entity wanting to protect customers from fraudulent websites that mimic the genuine website, the token database being custom generated in respect of the genuine website by or on behalf of the entity to contain data relating to tokens that occur in pages of the genuine website and/or likely to occur in fraudulent pages of one or more fraudulent websites mimicking the genuine website,
   obtaining a page from a website purporting to be the genuine website, extracting a plurality of tokens from the page, for each token, determining a token probability from data in the token database corresponding to the genuine website, the token probability being a probability indicative of the token being in a page of the genuine website,
   wherein the token probability of a token being in a page from the genuine website is based on a number of fraudulent pages mimicking pages of the genuine website and a number of non-fraudulent pages corresponding to the genuine website and/or other genuine websites that contain the token, said fraudulent pages and non-fraudulent pages being in a training corpus provided by or on behalf of the entity, and
   wherein using token probabilities determined for each token, calculating a page probability indicating the similarity of the page to a non-fraudulent page corresponding to the genuine website, and
   if the page probability achieves or exceeds a similarity threshold and the URL of the website is not that of the genuine website, determining that the page is a fraudulent page mimicking a page of the genuine website.

2. A method according to claim 1 wherein the token database is generated by or for the provider of the genuine website.

3. A method according to claim 1 wherein the data contained in the token database indicates, for each of a plurality of tokens, information indicating the number of fraudulent pages and non-fraudulent pages that contain the token from the training corpus of fraudulent and non-fraudulent pages.

4. A method according to claim 3 wherein the token database further comprises a count of the number of fraudulent pages in the training corpus, and a count of the number of non-fraudulent pages in the training corpus.

5. A method according to claim 3 wherein determining a token probability comprises:
   determining if the token exists in the token database, and calculating a token probability using:

$$\frac{trainingCorpus.b}{trainingCorpus.b + trainingCorpus.g \frac{training.nbad}{training.ngood}}$$

where:
   trainingCorpus.b is the number of fraudulent pages in the training corpus that contain the token,
   trainingCorpus.g is the number of non-fraudulent pages in the training corpus that contain the token,
   training.nbad is the number of fraudulent pages used in the training corpus,
   training.ngood is the number of non-fraudulent pages used in the training corpus.

6. A method according to claim 1 wherein calculating the page probability comprises:
   calculating a first probability comprising multiplying together the token probabilities of the tokens,
   calculating a second probability comprising multiplying together (1—the token probability) for each token probability of the tokens,
   calculating a further probability being the first probability divided by the sum of the first and second probabilities.

7. A method according to claim 1 wherein extracting a plurality of tokens from the page comprises one or more of:
   extracting text of the page or frame of the page and/or the title of the page, and extracting tokens from the text, or
   performing optical character recognition of an image of the page or frame and/or the title of the page and extracting tokens from the optically recognised characters.

8. A method according to claim 7 wherein calculating the page probability of the page being a fraudulent page comprises:
   calculating a first page probability using the calculated token probabilities for tokens extracted from text, and
   calculating a second page probability using the calculated token probabilities for tokens extracted from optically recognised characters.

9. A system for determining whether a page is a fraudulent page mimicking a page of a known genuine website, comprising an end user personal computer (PC), server or service adapted to download a page and adapted to:
   at a computer processor,
   receive at least one token database corresponding to a genuine website of an entity wanting to protect customers from fraudulent websites that mimic the genuine website, the token database being custom generated in respect of the genuine website by or on behalf of the entity to contain data relating to tokens that occur in pages of the genuine website and/or likely to occur in fraudulent pages of one or more fraudulent websites, obtaining a page from a website purporting to be the genuine website, extract a plurality of tokens from the page, for each token, determine a token probability from data in the token database, the token probability being a probability indicative of the token being in a page of the genuine website, wherein the token probability of a token being in a page from the genuine website is based on a number of fraudulent pages mimicking pages of the genuine website and a number of non-fraudulent pages corresponding to the genuine website and/or other genuine websites that contain the token, said fraudulent pages and non-fraudulent pages being in from a training corpus provided by or on behalf of the entity, and wherein using token probabilities determined for each token, calculating a page probability indicating the similarity of the page to a non-fraudulent page corresponding to the genuine website, and if the page probability achieves or exceeds a similarity threshold and the URL of the website is not that of the genuine website, determining that the page is a fraudulent page mimicking a page of the genuine website.

10. A system according to claim 9 wherein the token database is generated by or for the provider of the genuine website.

* * * * *